Patented Mar. 28, 1944

2,345,236

UNITED STATES PATENT OFFICE 2,345,236

PROCESS FOR MAKING PIPERAZINE COMPOUNDS

Henry C. Chitwood, Charleston, W. Va., assignor to Carbide and Carbon Chemicals Corporation, a corporation of New York No Drawing. Application October 24, 1941,
Serial No. 416,353

14 Claims. (Cl. 260—268)

This invention pertains to a method for making compounds containing the piperazine ring. More specifically, the invention relates to the production of 1-, 2-, 3- or 4-substituted piperazine compounds of the structure:

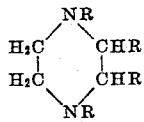

where R is hydrogen or a monovalent hydrocarbon radical, such as an alkyl, aryl or aralkyl radical. The invention is primarily directed to the production of piperazine which is a useful ingredient in the preparation of pharmaceuticals, medicinals, surface active agents, and other valuable industrial products.

According to this invention, piperazine and its derivatives are prepared by the hydrogenolysis of piperazino-piperazine compounds. For the production of the piperazine compounds illustrated above, piperazino-piperazines of the following molecular structure are subjected to hydrogenolysis:

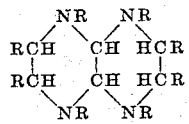

These piperazino-piperazine compounds may be prepared by the condensation of glyoxal with an excess of ethylene diamine, or substituted ethylene diamines, according to the principles described in the application of Chitwood and McNamee, Serial No. 416,372. The reaction of this invention proceeds with cleavage of the piperazino-piperazine ring system and the formation of piperazine, or substituted piperazines, and ethylene diamine, or its derivatives. A small amount of triethylene tetramine or its derivatives may also be formed as a by-product. The reaction may be illustrated as follows, showing the preparation of piperazine:

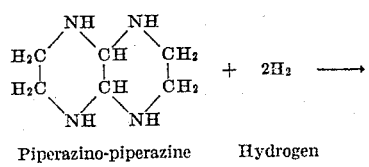

Piperazino-piperazine     Hydrogen

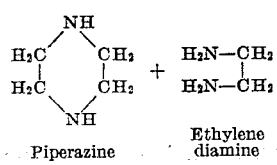

Piperazine     Ethylene diamine

The ethylene diamine may be recovered and reacted with glyoxal to form additional piperazino- piperazine, so that the net effect of the series of reactions will be the production of one mol of piperazine by the consumption of one mol of glyoxal, one mol of ethylene diamine, and two mols of hydrogen.

The hydrogenolysis is preferably carried out in the liquid phase under pressure. In carrying out this process the solid piperazino-piperazines are partly or wholly dissolved in an inert liquid, such as dioxane or dimethoxytetraglycol. Large amounts of solids may be initially present, but these will dissolve as the reaction proceeds. The presence of a hydrogenation catalyst, such as finely divided nickel, copper, copper chromite, or platinum, is important in securing a satisfactory rate of reaction. The temperature will vary depending on the specific catalyst employed. With very active catalysts a satisfactory rate of reaction is obtained at about 90° C. With less active catalysts, or if a faster rate of reaction is desired, higher temperatures are necessary. One very effective method of conducting the reaction is to rapidly heat the reaction mixture, enclosed in a pressure resistant vessel, to about 175° C. The rapid heating results in a faster rate of hydrogenolysis and, consequently, less difficulty is encountered from side reactions and contamination of the catalyst with tarry by-products.

The presence of water is ordinarily harmful, since it may result in hydrolysis of the piperazino-piperazines under the conditions of the reaction with consequent diminution of the yields. However, if the tendency of water to cause hydrolysis of the starting material is appropriately inhibited, for example, by adding an appreciable amount of a basic substance, such as ammonia, amines, or caustic soda, or if an excess of an inert diluent is present, the hydrogenolysis may be conducted in the presence of water. If water is present, practice of the rapid hydrogenolysis technique disclosed above is particularly beneficial in reducing the formation of products of side reactions.

Purified piperazino-piperazines may be employed as the starting material, but in large scale operations it is more economical to start with the crude reaction mixture resulting from the condensation of glyoxal and an excess of an ethylene diamine. Before commencing the hydrogenolysis, it is desirable to remove the water from the crude reaction mixture for the reasons discussed previously. This may be done by distilling the reaction mixture in the presence of a water-insoluble, volatile liquid, such as benzene, toluene, or diisopropyl ether, and removing the water as an azeotropic distillate. However, the effect of water in reducing the yields of piperazine through hydrolysis of the piperazino-piperazines can be minimized by the addition of a substantial amount of a diluent, such as dioxane. If this is done, it is not essential to remove the water.

Substituted piperazines, which have heretofore been difficult to prepare, may be readily produced by the methods of this invention. Thus, 1,4-dibutyl piperazine may be prepared by the catalytic hydrogenation of N, N', N'', N''' tetrabutyl piperazino-piperazine. Similarly, the corresponding dimethyl, dipropyl, diisopropyl, diamyl, di-2-ethylhexyl, dibenzyl and diphenyl derivatives may be prepared. Similarly, piperazines substituted in the 2 or 3 positions, such as 2-methyl piperazine, may be prepared by the hydrogenolysis of piperazino-piperazines derived from ethylene diamines substituted in the ethylene group. In its broader aspects, the invention is applicable to the hydrogenolysis of any compound having a piperazino-piperazine ring system to form a substituted piperazine.

*Example 1.*—One hundred and seventy-three (173) grams (1.22 mols) of piperazino-piperazine, 23 grams of Raney nickel catalyst (wet with dioxane when weighed) and 500 cc. of dioxane were placed in a bomb resistant to high pressures. Hydrogen was introduced to the bomb at room temperature until a pressure of 1190 pounds per square inch gauge was reached, and the bomb was then heated with agitation to 180° C. during a one-half hour period. Upon discontinuing the heating, the temperature rose to 215° C. during a ten minute period, but during an additional hour of heating at 185°–205° C. no additional hydrogen was absorbed as shown by the maintenance of the pressure in the bomb, indicating a completion of the reaction.

A total of 90.4 grams of piperazine was recovered from the reaction product along with an equivalent amount of ethylene diamine and the unchanged dioxane. The yield of piperazine amounted to 86% of the theoretical value.

*Example 2.*—Two hundred and sixty-six (266) grams of crude aqueous glyoxal containing 43.6% total aldehydes (approximately 2 mols of glyoxal) were added slowly with stirring to 570 grams of a 63.1% by weight aqueous solution of ethylene diamine (containing 6 mols of the amine). The temperature was held at 15° C. during the addition of the glyoxal by cooling, and the mixture was then heated on a water-bath at 65° C. for one hour. At the end of this time a large amount of crystalline piperazino-piperazine precipitated. The reaction mixture, along with 500 cc. of dioxane and 50 grams of Raney nickel catalyst (wet with dioxane) were placed in a bomb under a hydrogen pressure of 1000 to 1600 pounds gauge. The mixture was heated to a temperature of 135° C. in one hour and the temperature then increased to 165° C. during the following two hours. The product was filtered and distilled and a total of 94 grams of solid piperazine was recovered. Based on a 90% purity of the glyoxal solution used, the yield was 60.7% of the theoretical value.

*Example 3.*—Two hundred and sixty-eight (268) grams of an aqueous solution containing total aldehydes equivalent to two mols of glyoxal were slowly added to 1055 grams of an aqueous solution of ethylene diamine containing 68.3% (12 mols) of the amine. Upon completion of the condensation after moderate heating of the reactants, the reaction mixture was distilled with 500 cc. of benzene. The distillate consisted of a lower aqueous layer and an upper benzene layer which was returned to the distillation as reflux. The distillation was continued until 501 grams of the aqueous layer had been removed.

The residue was subjected to hydrogenolysis in a bomb at 1400 to 1600 pounds per square inch gauge pressure using 50 grams of Raney nickel catalyst (wet with dioxane when weighed). Over a period of two hours and 25 minutes the temperature was increased from 40° to 143° C. The crude reaction product was filtered and distilled and 106 grams of piperazine was obtained. Based on a 90% purity of the glyoxal solution, the yield was 68.5% of the theoretical value. Forty-eight (48) grams of a liquid amine boiling at 137°–154° C. at 2.5 mm. was also obtained along with ethylene diamine. On the same basis the yield of the higher boiling amine was 18.3% calculated as triethylene tetramine.

*Example 4.*—Two hundred and thirty-nine (239) grams of a 48.5% solution of aqueous glyoxal containing two mols of the glyoxal were added with stirring to 520 grams of an aqueous solution of propylene diamine containing 85.5% (6 mols) of the amine while maintaining the temperature at 25° to 40° C. The temperature was then raised to 100° C. Dimethyl piperazino-piperazine (which was probably a mixture of the two possible isomers) precipitated and the mixture became so thick that it could not be stirred. One liter of dioxane and 900 cc. of water were added to facilitate stirring and these liquids were later removed by evaporation at reduced pressure until about 1400 cc. of slushy mixture remained. The material was transferred to a bomb and 100 grams of Raney nickel catalyst were added. The hydrogenolysis was carried out at 125° C. at a pressure of 1500 to 2000 pounds per square inch gauge, the reaction being complete in three and one-half hours. Upon filtering and distilling the crude product, there was obtained 97 grams of 2-methyl piperazine, which is the compound derived from either isomer of the dimethyl piperazino-piperazine. The bulk of the product distilled at about 140° C., and the yield amounted to 48% of the theoretical value.

Modifications of the method of preparation of the piperazine compounds as shown in the foregoing examples and the synthesis of other substituted piperazines will be apparent to those skilled in the art, and such modifications are included within the scope of the invention.

I claim:

1. Process for making compounds containing the piperazine ring, which comprises subjecting compounds containing the piperazino-piperazine ring system to hydrogenolysis.

2. Process for making piperazine compounds of the structure:

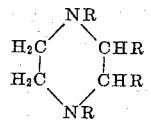

which comprises subjecting to hydrogenolysis piperazino-piperazine compounds of the structure:

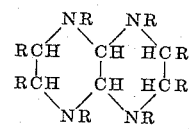

where R is of the group consisting of hydrogen and monovalent hydrocarbon radicals.

3. Process for making piperazine which comprises subjecting piperazino-piperazine to hydrogenolysis.

4. Process for making 2-methyl piperazine which comprises subjecting dimethyl piperazino-piperazine to hydrogenolysis.

5. Process for making compounds containing the piperazine ring which comprises subjecting compounds containing the piperazino-piperazine ring system to hydrogenolysis, the reaction being carried out in the liquid phase under pressure and in the presence of a finely divided metallic hydrogenation catalyst.

6. Process for making piperazine which comprises subjecting piperazino-piperazine to hydrogenolysis in the liquid phase under pressure and in the presence of a finely divided metallic hydrogenation catalyst.

7. Process for making piperazine which comprises subjecting piperazino-piperazine to hydrogenolysis in the liquid phase under pressure and in the presence of a finely divided nickel catalyst.

8. Process for making 2-methyl piperazine which comprises subjecting dimethyl piperazino-piperazine to hydrogenolysis in the liquid phase under pressure and in the presence of a finely divided nickel catalyst.

9. Process for making piperazine compounds of the structure:

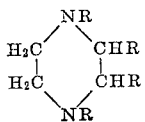

which comprises condensing glyoxal with a substantial molar excess of an ethylene diamine of the structure RHN—CHR—CHR—NHR, removing the water of reaction, and subjecting the remaining reaction products to hydrogenolysis, R being of the group consisting of hydrogen and monovalent hydrocarbon radicals.

10. Process for making piperazine which comprises condensing glyoxal with a substantial molar excess of ethylene diamine, removing the water of reaction and subjecting the remaining reaction products to hydrogenolysis.

11. Process for making 2-methyl piperazine which comprises condensing glyoxal with a substantial molar excess of propylene diamine, removing the water of reaction and subjecting the remaining reaction products to hydrogenolysis.

12. Process for making piperazine compounds of the structure:

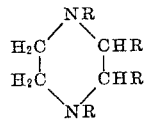

which comprises condensing glyoxal with a substantial molar excess of an ethylene diamine of the structure RHN—CHR—CHR—NHR, adding a substantial amount of an inert liquid, and subjecting the condensation products to hydrogenolysis, R being of the group consisting of hydrogen and monovalent hydrocarbon radicals.

13. Process for making piperazine which comprises condensing glyoxal with a substantial molar excess of ethylene diamine, adding a substantial amount of an inert liquid, and subjecting the condensation products to hydrogenolysis.

14. Process for making 2-methyl piperazine which comprises condensing glyoxal with a substantial molar excess of propylene diamine, adding a substantial amount of an inert liquid, and subjecting the condensation products to hydrogenolysis.

HENRY C. CHITWOOD.